H. L. HUGGINS.
BOLT AND NUT LOCK.
APPLICATION FILED JUNE 24, 1911.
1,035,089.
Patented Aug. 6, 1912.
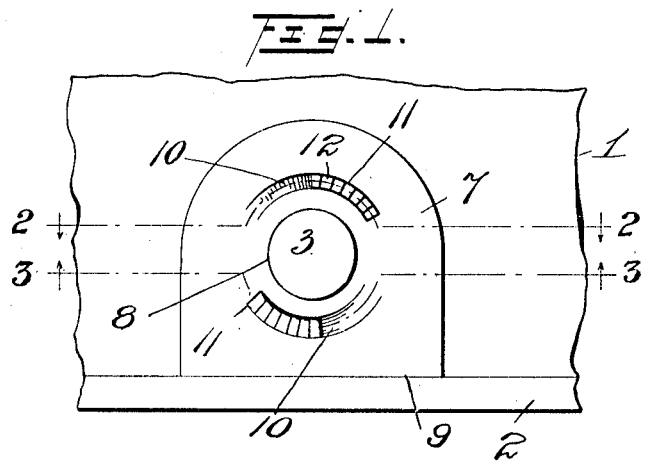
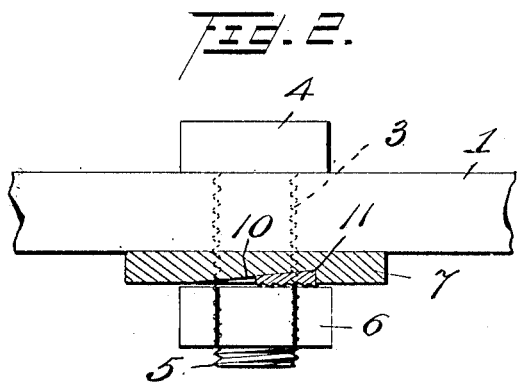
Witnesses
Inventor
Hillary L. Huggins
By
Attorney

UNITED STATES PATENT OFFICE.

HILLARY L. HUGGINS, OF DAMASCUS, VIRGINIA.

BOLT AND NUT LOCK.

1,035,089.  Specification of Letters Patent.  Patented Aug. 6, 1912.

Application filed June 24, 1911. Serial No. 635,087.

*To all whom it may concern:*

Be it known that I, HILLARY L. HUGGINS, a citizen of the United States of America, residing at Damascus, in the county of Washington and State of Virginia, have invented certain new and useful Improvements in Bolt and Nut Locks, of which the following is a specification.

This invention relates to bolt and nut locks and one of the principal objects of the invention is to provide simple and reliable means for locking a bolt and nut and to prevent either the bolt or nut from turning when locked, without mutilating either the bolt or nut.

Another object of the invention is to provide a reliable lock for a bolt and nut said bolt and nut being of the usual construction without requiring any modification or mutilation and the locking device comprising a washer or fish plate having curved inclined recesses for locking wedges to prevent the nut or bolt from turning when the nut has been tightened up against the washer or against the wedges in the recesses.

These and other objects may be attained by means of the construction illustrated in the accompanying drawings in which:—

Figure 1 is a front elevation of a plate similar to a fish plate for railway rails and showing the construction of the washer resting upon the base flange of the plate, the bolt and nut being removed; Fig. 2 is a horizontal sectional view on the line 2—2 looking in the direction indicated by the arrows of Fig. 1 showing the bolt and nut in place; Fig. 3 is a detail perspective view of one of the toothed wedges for locking the nut to the washer.

Referring to the drawing the numeral 1 designates a plate which may be used as a fish plate or for any purpose desired, said plate being preferably provided with a base flange 2. The plate 1 is provided with an aperture 3 extending through the same. An ordinary bolt provided with a square or polygonal head 4 and a screw threaded shank 5 is placed in said opening and an ordinary nut 6 is connected to the threaded end of the shank 5.

For holding the bolt and nut from turning after it has been screwed into place I provide a washer 7 having a plain unthreaded opening 8 through the same, said washer preferably having a plain lower edge 9 to rest on the flange 2 of the plate 1. The washer 7 is provided with two curved recesses 10 which are preferably concentric with the opening 8 in the washer 7 said recesses having inclined bottoms, as shown.

Placed in the recesses 10 are curved wedges 11 provided with ratchet teeth 12, said wedges being thicker at one end 13 and thinner at the other end 14, as shown more clearly in Fig. 4. The wedges 11 may be placed in the recesses 10, and when the nut 6 has been screwed onto the shank 5 of the bolt, until it has been brought in contact with the wedges, any movement tending to unscrew the nut will, by reason of the teeth of the wedges biting into the inner surface of the nut, force the wedges against the inclined bottoms of the recesses 10, making the teeth of the wedges bite more and more into the nut and thus effectually preventing accidental removal of the nut.

It will be obvious that the recesses 10 may be formed directly in the fish plate and any number of bolt holes may be used in the fish plate for securing the meeting ends of the rails together.

From the foregoing, it will be obvious that my invention is simple in construction, will hold the nut from turning off the bolt by the jarring action of the train as it passes over the rails.

It will also be obvious that any ordinary nut and bolt may be used without mutilation or change in structure.

What I claim is:

A nut lock comprising an immovable plate having a straight bottom edge adapted to rest against the bottom flange of a rail to keep said plate from turning, said plate being provided with a bolt hole for the reception of a bolt, said plate further provided at a short distance from said bolt hole with two curved recesses diametrically opposed and concentric with the bolt hole, said recesses having inclined cam bottoms and vertical parallel walls, one end of each recess terminating in a vertical shoulder, the other end merging into the outer surface of the plate, wedge-shaped curved locking members adapted to slide in said recesses, said locking members provided with teeth upon the upper surfaces thereof for engaging the under surface of a nut screwed onto said bolt to prevent accidental removal of said nut.

In testimony whereof I affix my signature in presence of two witnesses.

HILLARY L. HUGGINS.

Witnesses:
JOHN L. CASSELL,
G. W. OSBORN.

Copies of this patent may be obtained for five cents each, by addressing the "Commissioner of Patents, Washington, D. C."